United States Patent [19]
Baker

[11] 4,343,188
[45] Aug. 10, 1982

[54] FLUID PRESSURE INDICATING APPARATUS

[76] Inventor: William E. Baker, 10627 Sugar Hill, Houston, Tex. 77042

[21] Appl. No.: 181,755

[22] Filed: Aug. 27, 1980

[51] Int. Cl.³ ............................................. G01L 71/16
[52] U.S. Cl. ....................................... 73/706; 73/715; 73/744
[58] Field of Search ................. 73/744, 745, 746, 706, 73/707, 708, 715

[56] References Cited

U.S. PATENT DOCUMENTS 4,193,307 3/1980 Baker et al. ............................ 73/744

FOREIGN PATENT DOCUMENTS 48812 3/1889 Fed. Rep. of Germany ........ 73/744
482470 3/1917 France .................................... 73/706
962418 7/1964 United Kingdom .................. 73/744

Primary Examiner—Donald O. Woodiel
Attorney, Agent, or Firm—Bill B. Berryhill

[57] ABSTRACT

Fluid pressure indicating apparatus which may comprise: a body assembly adapted for connection to a source of fluid pressure; an indicator assembly attached to the body assembly for indicating magnitude of the fluid pressure; a transducer assembly carried by the body assembly for translating pressure applied to one side thereof to linear motion at the opposite side thereof; and an amplification assembly carried by the body assembly between the transducer assembly and the indicator assembly for amplifying the linear motion of the transducer assembly to increased motion at the indicator assembly in predetermined relationship with the pressure magnitude of the source of fluid pressure.

44 Claims, 3 Drawing Figures

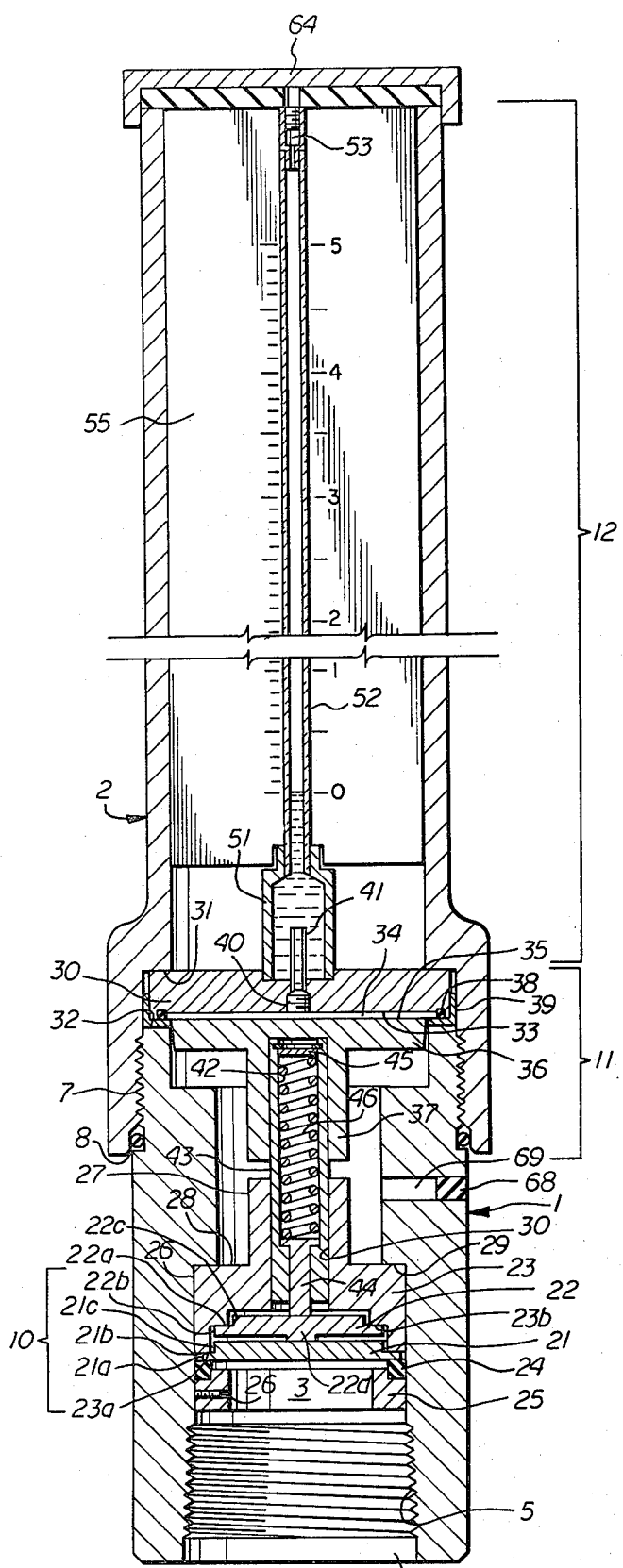
fig.1
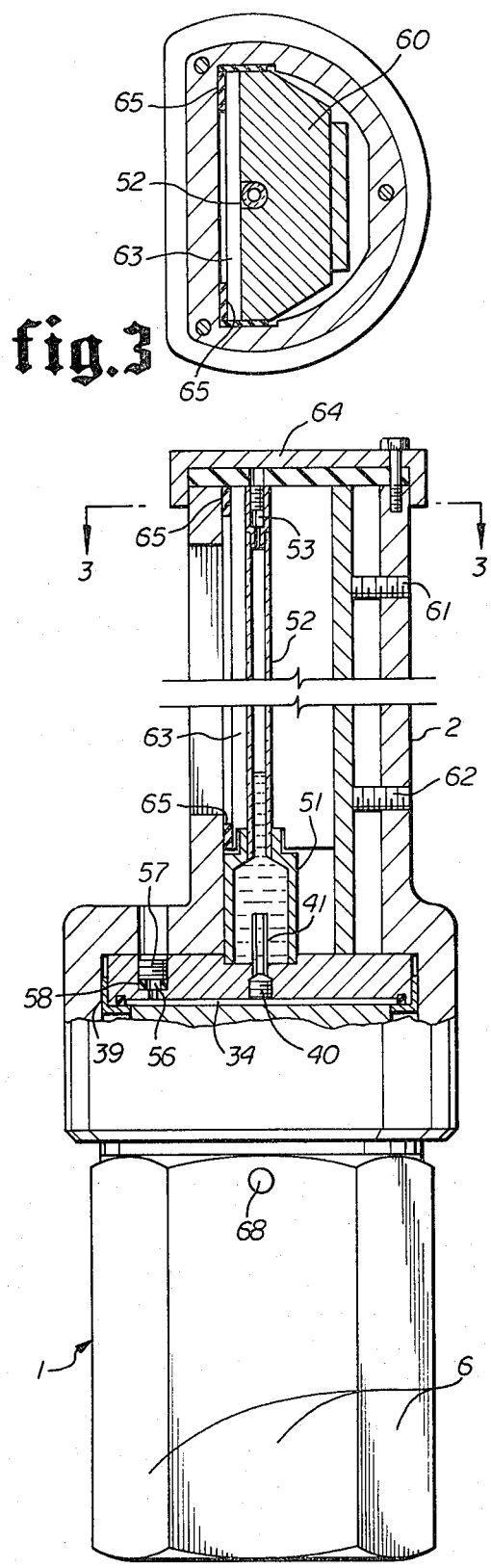
fig.2
fig.3

FLUID PRESSURE INDICATING APPARATUS

BACKGROUND OF THE INVENTION

1. Field of the Invention

The present invention pertains to fluid pressure sensing and indicating devices. In particular, it pertains to pressure apparatus particularly suitable for sensing and indicating pressures of mud systems, accumulators, wellheads, pipelines and related oil and/or gas equipment.

2. Description of the Prior Art

Apparatus for sensing and indicating fluid pressures are well known. Such devices are used in a wide variety of applications. There are many types of fluid pressure indicating devices, the type used being primarily dependent upon the particular application.

The bourdon tube pressure gauge is commonly used in many applications. A gauge of this type includes a flattened tube of spring bronze or steel formed in a circular pattern and one end of which is non-attached. When pressure is applied to the tube, the tube tends to straighten, actuating a mechanism which is usually provided with a pointer and registration with adjacent indicia of which indicates the pressure applied to the gauge. Because such gauges use hollow tubes, they may be easily plugged by heavy fluid or fluids containing debris or particulate matter. They are also affected by shock and vibration and not too well suited for systems in which large pressure surges may occur.

For the above-stated reasons, the bourdon tube type gauge is not suitable for many petroleum industry applications. This is particularly true of mud systems in which very viscous fluids and fluids containing large amounts of particulates are used in drilling or controlling oil and gas wells. Thus, devices have been developed for use with bourdon tube type gauges in an attempt to adapt such gauges to this application. For example, a protective device is disclosed in U.S. Pat. No. 3,415,123, which isolates the bourdon tube gauge from the mud system yet transmits the pressure thereof to the gauge. Such a device is effective in preventing the gauge from being plugged by the mud. However, it may not prevent the effects of shock vibration and pressure surging. In addition, it increases the complexity of the pressure indicating system, resulting in greater installation, operation and maintenance costs.

Other pressure indicating devices have been developed which totally depart from the bourdon tube type gauge. One such development is the diaphragm gauge which utilizes a fluid filled cavity between two diaphragms. Pressure from the mud system is applied to one diaphragm, causing it to deflect and because of the incompressibility of the fluid in the cavity, results in a corresponding deflection of the other diaphragm. The second diaphragm which is not in contact with the fluid whose pressure is being measured is usually in contact with some type of translating mechanism which translates the deflection of the diaphragm to movement of an indicator needle which in cooperation with a calibrated dial indicates the pressure of the mud system. Examples of such devices may be seen in U.S. Pat. Nos. 2,297,679 and 4,166,396, widely accepted mud pressure gauges.

Another mud gauge which is similar to diaphragm type gauges is the expanding bellows type shown in U.S. Pat. No. 2,537,729. Although it uses a bellows instead of two diaphragms, the operation of such a gauge is very similar to the diaphragm type gauges mentioned above.

Although diaphragm type gauges are definitely more suited for use with mud systems, they are not totally without problems. One major problem is that the pressure-responsive element of such gauges may be made of a stack of metal gaskets and discs which are pressed together to form a fluid filled cavity. Thus a number of metal to metal sealing surfaces are required to remain leak-tight at pressures of up to 20,000 p.s.i. for a period of time. Many such gauges cannot function leak-tight even for the warranty period. In additon, such gauges are commonly provided with a rubber disc in its pressure-responsive element, which creates friction and causes errors in measurement. Such gauges are also complex, utilizing a large number of parts susceptible to manufacturing errors and very expensive to manufacture and maintain. Thus, even though the diaphragm type pressure gauge has been widely used over the past few decades, it leaves much to be desired. However, because it has been the only type which comes anywhere close to meeting the needs, it continues to be used.

SUMMARY OF THE PRESENT INVENTION

In the present invention, a fluid pressure indicating device is provided which overcomes most of the undesirable features of the presently accepted diaphragm pressure gauge. Its design is a substantial departure from the prior art, yet is considerably less complex in manufacture and operation.

The fluid pressure indicating apparatus of the present invention includes a body or housing which is adapted for connection to a source of fluid pressure, such as the mud system of a well-drilling rig. Carried in the body is a transducer assembly one side of which is in fluid communication with the source of fluid pressure through an inlet in the body. The transducer assembly utilizes at least one circular plate member, the periphery of which is relieved to form an annular surface for bearing against a corresponding annular support shoulder within the body. The annular surface substantially coincides with the neutral stress surface of the plate member when subjected to bending forces from exposure of one side thereof to the source of fluid pressure. When fluid pressure is applied to one side of the plate member, linear motion is produced at the opposite thereof.

The fluid pressure indicating apparatus of the present invention also includes an amplification assembly carried by the body between the transducer assembly and an indicator assembly . The indicator assembly may comprise a fluid container partially filled with a fluid indicator medium and the level of which indicates the magnitude of fluid pressure applied to the transducer assembly. The amplification assembly includes a variable volume chamber filled with fluid indicator medium and in fluid communication with the fluid container of the indicator for transfer of fluid indicator medium therebetween. The volume of the variable chamber and the level of the fluid indicator medium in the fluid container is determined by the amount of linear motion at the opposite side of the transducer assembly produced in response to the magnitude of fluid pressure in the mud system.

The fluid pressure indicating apparatus of the present invention is essentially friction-free and has greater accuracy than present diaphragm type pressure gauges. It is less susceptible and sensitive to seal leakage and provides dampening of pressure pulsations. It provides easy field adjustable calibration and greater readability from a distance. It provides for temperature compensation and overpressure protection. Its increased ruggedness and shock-resistance maintains accuracy even under the rough shipping and handling and operating conditions of oil field service. Furthermore, the fluid pressure indicating apparatus of the present invention has fewer parts and is less expensive to manufacture and maintain than the mud pressure gauges of the prior art. Many other objects and advantages of the fluid pressure indicating apparatus of the present invention will become apparent from reading the description which follows in conjunction with the accompanying drawings.

BRIEF DESCRIPTION OF THE DRAWINGS

FIG. 1 is a front elevation view, in section, of fluid pressure indicating apparatus according to a preferred embodiment of the invention;

FIG. 2 is a side elevation view, partially in section, of the embodiment of FIG. 1; and FIG. 3 is a cross-sectional view of a preferred embodiment of the invention, taken along lines 3—3 of FIG. 2.

DESCRIPTION OF A PREFERRED EMBODIMENT

Referring now to the drawings, the fluid pressure indicating apparatus of the present invention comprises a body assembly having a lower housing or body 1, and upper housing or body 2. The body 1 is provided with a central passage 3 having an inlet 4 and may be provided with threads 5 for connection to a source of fluid pressure (not shown) such as a drilling mud system, blowout preventers, flowing wellheads, gathering lines, pipelines, or other oil and/or gas systems. The exterior of the body may be provided with flats 6 for engagement with a wrench or the like.

The upper housing 2 may be attached to the lower housing or body 1 by a threaded connection 7 provided with an annular seal 8. The upper housing 2 will be described hereafter in more detail. However, for the present it is sufficient to note that it is primarily for the purpose of carrying and protecting an indicator assembly 12 to be more fully understood hereafer.

Carried within the body 1 is a transducer assembly 10, the purpose of which is to translate pressure applied to one side thereof to linear motion at the opposite thereof. Also carried by the body 1 above the transducer assembly 10 is an amplifier assembly 11, the purpose of which is to amplify the linear motion produced by the transducer assembly 10 to increased motion in the indicator assembly 12 surmounted thereon. Actually, some portions of the indicator assembly 12 also make up portions of the amplifier assembly 11, as will be seen hereafter.

The transducer assembly 10 may comprise one or more pressure sensor plates 21 and 22, a support member 23, a resilient annular seal 24 and retainer ring 25. The pressure sensor plates 21 and 22 are held in the support member 23 by a seal 24 and retainer ring 25. The retainer ring 25 may be fixed in the body 1 by set screws 26 or by threaded connection (not shown) if desired.

The pressure sensor plate 21 is a circular plate member, the periphery of which is relieved to form an annular surface 21a for bearing against a corresponding annular support shoulder 23a on the support member 23.

The annular surface 21a substantially coincides with the neutral stress surface of the plate member 21 when subjected to bending forces from exposure of one side thereof (the lower side as shown in FIG. 1) to the measured source of fluid pressure. It will be noted that enough clearance 21c is provided around the edge of the plate member 21 so that even under a certain amount of bending, there is no interference between the edges of the plate member and the surrounding surfaces of the body 1 or support 23. It will also be noted that if the plate member 21 is bent due to pressures from the fluid pressure source, there is essentially little frictional resistance since the resilient seal 24 easily yields to such bending. Thus, the plate member 21 can be considered as being unclamped permitting substantially free movement thereof when subjected to bending forces.

The second pressure sensor plate 22 can be circular, rectangular or any other shape, since no sealing is required at its edges such as with the first sensor plate 21. However, like sensor plate 21 the second plate member is relieved at its extremities to form bearing surfaces 22a for bearing against a corresponding support shoulder 23b within the support member 23. Clearance 22c is provided at the edge of the plate member 22. In addition, the second plate member 22 is provided with a central projection 22d for contact with one side of the first sensor plate 21. Thus, frictional engagement of the second sensor plate 22 with the first sensor plate 21 and the surrounding support member is essentially eliminated. Thus, the second plate member 22 can also be considered as unclamped.

The outer surfaces of the support member 23 may be formed by cylindrical surfaces 26, 27 joined by annular surface 28. Annular surface 28 rests against a corresponding annular support shoulder 29 within body 1. It will also be noted that the support member 23 is provided with a central cylindrical bore 30, the purpose of which will be more fully understood hereafter.

At this point, it is helpful to understand the operation of the transducer 10 and its sensor plates 21, 22. As mentioned above, the lower circular sensor plate 21 rests on the annular support shoulder 23a in an unclamped fashion. Assuming uniform loading by pressures from the measured fluid pressure source on one side thereof (the lower side as seen in FIG. 1) the formula for determining linear motion or deflection at the center of plate member 21 can be determined from the following equation:

$$f = \frac{.696Pr^4}{Et^3}$$

where:
 f=deflection in inches
 p=pressure in pounds per square inch
 r=radius of the plate in inches
 E=modulus of elasticity of the plate material in pounds per square inch; and
 t=thickness of the plate in inches.

The maximum stress on plate member 21 can be determined by the following equation:

$$s = \frac{.375Pr^2}{t^2}(3 + m)$$

where:
 s=stress in pounds per square inch; and m = Poisson's ratio.

Under many circumstances, a single pressure sensor plate 21 may be all that is required. However, the pressure being measured may be so great as to exceed the yield strength of the plate member 21 at the required plate deflection. Where such conditions may be encountered, it may be necessary to add one or more additional plate members such as the second sensor plate 22. However, the load on the plate 22 applied thereto by the lower plate 21 is concentrated at the center rather than being uniformly distributed as on the first plate member 21. For such a situation, the formula for deflection at the center of plate 22 would be as follows:

$$f = \frac{.5305Fr^2}{Et^2}$$

where:
- f = deflection in inches
- F = concentrated load at center of plate 22 in pounds
- r = radius of the plate in inches
- E = modulus of elasticity of the plate material in pounds per square inch; and
- t = thickness of the plate in inches.

The maximum stress of plate member 22 can be determined by the equation:

$$s = \frac{3(1+m)F}{2\pi t^2} \left[ \frac{1}{m+1} + \log_e \frac{r}{r_o} - \left(\frac{1-m}{1+m}\right) \frac{r_o^2}{4r^2} \right]$$

where:
- s = stress in pounds per square inch
- $r_o$ = radius of projection 22d in inches; and
- m = Poisson's ratio.

The amplification assembly 11 includes a flange-like member 30, the edges of which are retained between an annular shoulder 31 of upper housing 2 and the annular end surface 32 of body 1. The downwardly facing side of flange member 30 is recessed to provide a planar surface 33 which defines one end of a variable chamber 34, the other end of which is defined by a diaphragm covered planar surface 35 of the head 36 of a piston member 37. It can be understood that upon reciprocation of the piston member 37, the volume of chamber 34 will vary accordingly. The variable volume chamber 34 is filled with a fluid indicator medium such as mercury. To maintain a seal, preventing the escape of mercury from the variable volume chamber 34, a thin flexible diaphragm is stretched across the recess in the flange member 30 for contact with the surface 35 of the piston head 36. The diaphragm is held in place by annular seal 38 and a ring clamp 39. The diaphragm could be made of Mylar which has a high tensile strength and good flexibility.

The variable volume chamber 34 is in fluid communication with the indicator assembly 12 to be described hereafter, through a central passage which may include a flow restrictive screw 40 and a small tubular member or isolator tube 41. It will be understood that if the piston member 37 moves upwardly some of the fluid indicator medium in the chamber 34 will be forced upwardly through the flow restriction of screw 40 and the tube 41.

The piston member 37 is provided with a cylindrical bore 42 for receiving the upper portion of a transmission assembly by which linear motion of the transducer assembly 10 is transmitted to the amplifier assembly 11.

The transmission assembly includes a tubular barrel 43, one end of which is also disposed in the cylindrical bore 30 of the support member 23. Mounted for reciprocation in a counterbore of the tubular barrel 43 is a plunger 44. Mounted between the upper end of the plunger 44 and a retainer ring 45 is a spring member 46 which biases the plunger 44 towards contact with the uppermost pressure sensor plate, in this case, plate 22.

The indicator assembly 12 includes an inverted cup-like reservoir 51 and a vertical transparent tubular member 52 of relatively small cross-section. The cup-like reservoir 51 is affixed to the flange member 30 in such a way that leakage of the fluid indicator medium (mercury) therein is prevented. The fluid indicator medium in the inverted cup-like reservoir 51 is the same medium as in the variable volume chamber 34 and there is free exchange of such medium depending upon the position of piston 37. As shown in FIG. 1, the level of the mercury is at the zero pressure indicia.

The upper end of the transparent tubular member 52 is provided with a highly compressed fiber filter 53 of either natural or synthetic fibers which allows air to bleed in and out of the tube but because of the high surface tension of mercury, will not allow the fluid indicator medium to exit the tube 52. The volume of the inverted cup reservoir 51 should be greater than twice the volume of the transparent tubular member 52. Thus, even if the entire apparatus is turned on its side or inverted, air may flow to the inverted cup 51 but because the isolator tube 41 is always immersed in the fluid indicator medium, air is prevented from entering the variable volume chamber 34.

It will be noted that a small reservoir 56 is provided in flange member 30 closed by an adjustable screw 57 and a resilient seal 58. This is used to calibrate the indicator assembly. For example, if the level of mercury in tube 52 is not at zero when encountering no pressure, the screw 57 can be rotated displacing fluid until the level is at zero.

The indicator assembly also includes an indicia plate 55 on which indicia may be printed for various levels of fluid in the indicator tube 52 to correspond with pressure being measured by the apparatus. The transparent tube 52 may be mounted in a groove provided therefor on a carrier member 60 which is held in place by set screws 61 and 62. A transparent protective face plate 63 may also be provided and an upper closure member 64 attached to housing 2 to keep the various members of the indicator assembly in place.

The seals and gaskets 65 in the upper housing 2 seal the interior of the apparatus from outside environment but at ambient pressures and temperatures. Normally, both sides of the piston member 37 are subjected to the same or equal pressures of the housing. However, if pressure below the piston member increases due to leakage of the seal 24 or for any other reasons, a relief plug 68 pops out of the body 1 relieving pressure through a port 69.

Statement of Operation

Referring now to all of the drawings, the operation of the fluid pressure indicating apparatus of the present invention will be described. The apparatus is of course connected to the source of fluid pressure which it is to measure by connection of the threads 5 with a corresponding threaded member in the measured fluid system. For example, if the pressure of mud in a mud system is being measured, the apparatus might be connected to a piping tee in a pipe manifold on the discharge side of mud pumps. In any event, it is understood that whatever fluid is being measured, the pressure of such fluid is transmitted to the transducer assembly 10 through the inlet 4 and central passage 3 of the lower housing or body 1.

Prior to submitting the apparatus to pressure, the level of fluid indicating medium in the indicator tube 52 should be calibrated or "zeroed". This can be done by adjusting the screw 57, as previously described.

After calibrating the indicator apparatus, pressure of the system is applied to one side of the transducer assembly 10, i.e. the lower side of sensor plate 21 as shown in FIG. 1. As previously mentioned, the force produced by the fluid pressure is evenly distributed on the plate member 21 causing the plate member 21 to deflect in a predetermined fashion and at a maximum amount at the center thereof. If additional sensor plates such as second sensor plate 22 are utilized, a portion of this force is also transmitted to the center of the succeeding plate members via central projection 22d thereon. As previously mentioned, the plate thickness of and the maximum force and stress on plate member 22 can be predetermined by a formula previously set forth herein. These sensor plates, whether one or more, cooperate together so that the pressure from the fluid pressure source applied thereto is translated to predetermined linear motion at the opposite side thereof.

The linear motion of the transducer assembly 10 is transmitted to the amplification assembly 11 by the transmission assembly which includes tubular barrel 43, plunger 44, and spring member 46. The spring constant of spring 46 is selected so that under gradually increasing pressures, the linear motion of the translating assembly is transmitted directly through the plunger 44 and spring 46 to the piston member 37 of the amplification assembly 11, with the head of plunger 44 remaining in contact with tubular barrel 43. However, if there is a large pressure surge or sudden variation in pressure, the spring 46 absorbs such sudden change so that the movement of the piston member 37 is much less abrupt.

As the piston member 37 moves in response to the linear movement of transducer assembly 10 the piston head 36 bearing against the Mylar diaphragm at its surface 35 displaces fluid indicator medium from the variable chamber 34 through the flow restrictive screw 40 and isolator tube 41. Due to the flow restriction of these two members, additional absorbing of pressure surges is provided. Of course, as fluid indicating medium is displaced from the variable chamber 34 into the inverted cup reservoir 51 and indicator tube 52, the level of the fluid indicating medium rises in the fluid indicator tube 52. As previously pointed out, since the cross-sectional area of the variable chamber 34 is substantially greater than the cross-sectional area of indicator 52, linear movement of the piston member 37 (which is the same as the linear motion produced by the translator assembly 10) is greatly increased at the level of the fluid indicator medium in the indicator tube 52. For example, assuming the diameter of the piston member 37 to be 2.875 inches and the diameter of the indicator tube 52 to be 0.13042 inches, a piston displacement of 0.012348 inches will result in six-inch displacement of the fluid indicator medium level in the indicator tube 52. Thus, the amplification assembly 11 amplifies the linear motion produced by the transducer assembly 10 to substantially increase motion of the level of indicator fluid medium in the indicator tube 52. This motion of course bears a direct relationship to the pressure being sensed by the translator assembly 10 and the level of the indicator fluid medium in cooperation with the indicia on indicia plate 55 gives an accurate indication of the fluid pressure being sensed by the apparatus.

An important feature of the present invention is its ability to compensate for temperature changes. Of course, the fluid indicator medium may expand or contract due to temperature increases or decreases, respectively. By proper selection of the materials of the transmission assembly and the surrounding portion of the lower housing 1, differential expansion can be utilized to cause the piston member 37 to be moved in a direction to compensate for the effect of the greater expansion of the fluid indicator medium over its container.

Conclusion

Thus, the fluid pressure indicating apparatus of the present invention offers a means of measuring pressure of previously hard-to-measure fluids, such as mud, yet providing great accuracy and ruggedness. The unique design provides pressure surge dampening and temperature compensation unequaled in the prior art. The apparatus is extremely rugged, resisting shock and vibration to a degree not present in the prior art. The unique design of the indicator assembly allows the apparatus to be subjected to rough handling and even total inversion without affecting the fluid indicator assembly. The translator assembly, utilizing unclamped plates, is essentially friction-free so as to provide greater accuracy than present diaphragm-type gauges. The amplification assembly results in improved readability at greater distances. Furthermore, these improved features are provided even though the device has less than half the parts of competitive gauges. Such a reduction in parts results in improved reliability, simplified assembly, lowered manufacturing costs, reduced parts inventory, less dependence on and expense of outside vendors and easier field repair.

It should also be noted that while the combination of assemblies described herein results in fluid pressure indicating apparatus of superior characteristics, various assemblies of the present invention could be utilized independently with comparable results. For example, the translating assembly 10 could be utilized in any device in which it is desired to translate pressure to linear motion. For example, the translator assembly 10 could be utilized with other indicating apparatus such as the M-shaped or fork-type mechanism shown in U.S. Pat. No. 4,166,396. Likewise, the amplifying assembly 11 could be utilized in any device in which it is desired to amplify linear motion produced by pressure or any other means.

Thus, the components of the present invention can be utilized as described herein, separately or in various other combinations as the particular application may call for. In fact, the utilization of the components of the present invention is limited only by the imagination. Many variations thereof will be apparent to those skilled in the art. Therefore, it is intended that the scope of the invention be limited only by the claims which follow.

I claim:
1. Fluid pressure indicating apparatus comprising:
   body means adapted for connection to a source of fluid pressure and having an inlet in fluid communication therewith;

indicator means attached to said body means for indicating the magnitude of said fluid pressure;

transducer means carried by said body means and one side of which is in fluid communication with said source of fluid pressure through said inlet, said transducer means translating pressure applied to said one side thereof from said source of fluid pressure to linear motion at said opposite side thereof;

amplification means carried by said body means between said transducer means and said indicator means for amplifying said linear motion at said opposite side of said transducer means to increased motion of said indicator means in predetermined relationship with the magnitude of said fluid pressure; and said transducer means comprising at least one circular plate member, one side of which is exposed to said source of fluid pressure, the opposite side of which faces said amplification means, and the periphery of which is relieved to form an annular surface for bearing against a corresponding annular support shoulder within said body means, said annular surface substantially coinciding with the neutral stress surface of said plate member when subjected to bending forces from exposure of said one side thereof to said source of fluid pressure.

2. Fluid pressure indicating apparatus as set forth in claim 1 including sealing means carried by said body means sealing around the edges of said plate member and the surrounding surfaces of said body member to seal said opposite side of said plate member from said source of fluid pressure.

3. Fluid pressure indicating apparatus as set forth in claim 2 in which said sealing means includes an annular resilient seal member disposed between said plate member and an annular retainer ring removably affixed to said body member removal of said retainer ring and said resilient seal member permitting removal of said plate member through said body means inlet.

4. Fluid pressure indicating apparatus as set forth in claim 2 in which the edges of said plate member are unclamped permitting substantially free movement thereof when subjected to said bending forces.

5. Fluid pressure indicating apparatus as set forth in claim 2 in which the center of said opposite side of said plate member is the means through which said linear motion at said opposite side of said transducer means is transferred to said amplification means.

6. Fluid pressure indicating apparatus as set forth in claim 5 including a second plate member one side of which faces said opposite side of said circular plate member and the opposite side of which faces said amplification means, said opposite side of said second plate member being relieved at the extremities thereof to form bearing surfaces for bearing against a corresponding support shoulder within said body means, said bearing surfaces substantially coinciding with the neutral stress surface of said second plate member when said second plate member is subjected to bending forces applied thereto from said circular plate member as a result of said exposure to said source of fluid pressure.

7. Fluid pressure indicating apparatus as set forth in claim 6 in which said one side of said second plate member is provided with a projection near the center thereof for contact with said center of said opposite side of said circular plate member substantially eliminating frictional engagement between said circular plate member and said second plate member except at said projection.

8. Fluid pressure indicating apparatus as set forth in claim 1 in which said annular support shoulder is provided on a cylindrical member disposed between said circular plate member and an annular shoulder on said body means, said cylindrical member being removable from said body means through said inlet upon removal of said circular plate member therethrough.

9. Fluid pressure indicating apparatus as set forth in claim 1 including support means carried by said body means and against which said opposite side of said transducer means bears for arresting linear motion thereof when the magnitude of said fluid pressure reaches a predetermined amount.

10. Fluid pressure indicating apparatus comprising:

body means adapted for connection to a source of fluid pressure and having an inlet in fluid communication therewith;

indicator means attached to said body means comprising a fluid container partially filled with a fluid indicator medium and the level of which indicates the magnitude of said fluid pressure;

transducer means carried by said body means and one side of which is in fluid communication with said source of fluid pressure through said inlet, said transducer means translating a pressure applied to said one side thereof from said source of fluid pressure to linear motion at said opposite side thereof; and amplification means carried by said body means between said transducer means and said indicator means for amplifying said linear motion at said opposite side of said transducer means to increased motion at said indicator means in predetermined relationship with the magnitude of said fluid pressure, said amplification means comprising a variable volume chamber filled with said fluid indicator medium and in fluid communication with said fluid container for transfer of fluid indicator medium therebetween, the volume of said variable chamber and the level of fluid indicator medium in said fluid container being determined by the amount of linear motion at said opposite side of said transducer means produced in response to the magnitude of said fluid pressure, said variable volume chamber being partially defined by a first stationarily fixed planar surface and a second planar surface carried on the head of a piston member and movable therewith in response to said linear motion of said transducer means, said first planar surface being provided at the bottom of a cylindrical recess formed in a flange member affixed to said body means, said piston member being reciprocal within said cylindrical recess in response to said linear motion of said transducer means for varying the volume of said variable volume chamber.

11. Fluid pressure indicating apparatus as set forth in claim 10 including a flexible diaphram member covering the opening of said cylindrical recess and sealed around the periphery thereof to maintain said fluid indicator medium therein and against which said head of said piston member bears upon reciprocation within said recess.

12. Fluid pressure indicating apparatus as set forth in claim 10 in which said amplification means comprises a transmission assembly between said transducer means and said piston member and by which said linear motion of said transducer means is transmitted thereto.

13. Fluid pressure indicating apparatus as set forth in claim 12 in which said transmission assembly comprises spring means between said piston member and said transducer means capable of absorbing sudden linear motion of said transducer means created by sudden pressure increases in said source of fluid pressure.

14. Fluid pressure indicating apparatus as set forth in claim 13 in which said spring means comprises a helically wound spring surrounded by a tubular barrel from one end of which projects a plunger member and against which said spring bears biasing said plunger member toward contact with said transducer means.

15. Fluid pressure indicating apparatus as set forth in claim 14 in which one end of said tubular barrel is disposed in a cylindrical hole in said piston and the other end of which is disposed in a cylindrical hole in a support member carried by said body means adjacent said transducer means.

16. Fluid pressure indicating apparatus as set forth in claim 15 in which the materials of said transmission assembly, said support member and said body means are of preselected materials, the differential temperature expansion of which effects preselected movement of said piston member, relative to said cylindrical recess, so as to compensate for the temperature expansion of said indicator medium so as to have no substantial effect on said level of said fluid indicator medium in said fluid container under variations in ambient temperatures and temperature of said source of fluid pressure.

17. Fluid pressure indicating apparatus comprising:
body means adapted for connection to a source of fluid pressure and having an inlet in fluid communication therewith;
indicator means attached to said body means comprising a fluid container partially filled with a fluid indicator medium and the level of which indicates the magnitude of said fluid pressure, said fluid container comprising a vertical transparent tubular member of uniform cross-sectional area provided with pressure indicia corresponding with levels of fluid indicator medium therein to indicate the magnitude of said fluid pressure;
transducer means carried by said body means and one side of which is in fluid communication with said source of fluid pressure through said inlet, said transducer means translating a pressure applied to said one side thereof from said source of fluid pressure to linear motion at said opposite side thereof; and
amplification means carried by said body means between said transducer means and said indicator means for amplifying said linear motion at said opposite side of said transducer means to increased motion of said indicator means in predetermined relationship with the magnitude of said fluid pressure, said amplification means comprising a variable volume chamber filled with said fluid indicator medium and in fluid communication with the lower end of said transparent tubular member for transfer of fluid indicator medium therebetween, through a flow restricted passage to reduce the effect of pressure surges in said source of fluid pressure, the volume of said variable chamber and the level of fluid indicator medium in said transparent tubular member being determined by the amount of linear motion at said opposite side of said transducer means produced in response to the magnitude of said fluid pressure.

18. Fluid pressure indicating apparatus as set forth in claim 17 including a small fluid chamber in fluid communication with said variable volume chamber and having a sealed adjustment member therein adjustment of which changes said level of fluid indicator medium within said transparent tubular member to correspond with the actual magnitude of said fluid pressure.

19. Fluid pressure indicating apparatus as set forth in claim 17 in which the upper end of said transparent tubular member is provided with filter means which allows passage of air therethrough but prevents passage of said fluid indicator medium.

20. Fluid indicator apparatus as set forth in claim 17 in which said fluid container includes an inverted cup-like reservoir between the lower end of said transparent tubular member and said variable volume chamber.

21. Fluid indicator apparatus as set forth in claim 20 in which said flow restrictive passage includes a small tubular member projecting centrally upwardly into said inverted cup-like reservoir, the volume of said cup-like reservoir being greater than twice the volume of said transparent tubular member.

22. Fluid pressure indicating apparatus comprising:
body means adapted for connection to a source of fluid pressure and having an inlet in fluid communication therewith;
indicator means attached to said body means for indicating the magnitude of said fluid pressure;
transducer means carried by said body means and one side of which is in fluid communication with said source of fluid pressure through said inlet, said transducer means translating pressure applied to said one side thereof from said source of fluid pressure to linear motion at said opposite side thereof; and
amplification means carried by said body means between said transducer means and said indicator means for amplifying said linear motion at said opposite side of said transducer means to increase motion of said indicator means in predetermined relationship with the magnitude of said fluid pressure, said amplification means comprising a variable volume chamber one end of which is closed by a flexible diaphram member and at least partially defined by a planar surface carried on the head of a piston member which bears against said diaphram member; said transducer means comprising at least one circular plate, one side of which is exposed to said source of fluid pressure and through the opposite side of which a force may be applied to said piston member for varying the volume of said variable volume chamber by movement of said plate in response to changes in the magnitude of said fluid pressure.

23. Fluid indicator apparatus as set forth in claim 22 in which said fluid indicator comprises a transparent tubular member partially filled with fluid indicator medium and in fluid communication with said variable volume chamber which is filled with said fluid indicator medium, the volume of said variable volume chamber and the level of fluid indicator medium in said transparent tubular member being determined by the amount of linear motion at the center of said plate member in a direction perpendicular to the surface thereof.

24. Fluid indicator apparatus as set forth in claim 23 including a transmission assembly between said piston member and said plate member by which said linear motion of said plate member is transferred to said piston member, said transmission assembly including spring means for absorbing sudden linear motion of said plate member created by sudden pressure surges in said source of fluid pressure.

25. Fluid indicator apparatus as set forth in claim 24 in which said variable volume chamber is in fluid communication with said transparent tubular member through a flow restrictive passage for reducing the effect of pressure surges in said source of fluid pressure.

26. Means for translating pressure to linear motion comprising:
body means adapted for connection to a source of fluid pressure and having an inlet in fluid communication therewith;
a circular plate member the periphery of which is relieved to form an annular surface for bearing against a corresponding annular support shoulder within said body means, said annular surface substantially coinciding with the neutral stress surface of said plate member when subjected to bending forces from exposure of one side thereof to said source of fluid pressure through said inlet; and
sealing means sealing between said plate member and the surrounding surfaces of said body means so that said source of fluid pressure is isolated from the opposite side of said plate member while pressure is applied to said one side thereof bending said plate and producing linear motion at the center thereof and along the axis thereof in direct relationship with the magnitude of said fluid pressure.

27. Pressure translating means as set forth in claim 26 in which the outer limits of said annular surface is joined to said one side of said plate member by a first edge surface and the inner limits of said annular surface is joined to said opposite side of said plate member by a second edge surface, enough clearance being provided around said second edge surface to prevent interference therewith upon said bending of said plate member from said exposure of said one side thereof to said source of fluid pressure.

28. Pressure translating means as set forth in claim 27 in which said sealing means comprises an annular retainer ring attached to said body member and a resilient annular seal member between said retainer ring and said one side of said plate member providing said sealing between said plate member and said surrounding body surfaces without materially affecting said bending of said plate member.

29. Pressure translating means as set forth in claim 28 in which said retainer ring is removable from said body means allowing removal of said seal member and said plate member from said body means.

30. Pressure translating means as set forth in claim 27 including a second plate member one side of which faces said opposite side of said circular plate member and the opposite side of which is relieved at the outer extremities thereof to form bearing surfaces for bearing against a corresponding support shoulder within said body means, said bearing surfaces substantially coinciding with the neutral stress surface of said second plate member when subjected to bending forces applied thereto from said circular plate member as a result of said exposure to said source of fluid pressure.

31. Pressure translating means as set forth in claim 30 in which one of said plate members is provided with a projection near the center thereof for contact with the mutually facing side of the other of said plate members substantially eliminating frictional engagement between said circular plate member and said second plate member except at said projection.

32. Pressure translating means as set forth in claim 31 in which said body means includes a cylindrical cavity in which is carried a cylindrical support member on which is provided said annular support shoulders for said circular plate member and said second plate member.

33. Pressure translating means as set forth in claim 32 in which said cylindrical support member is provided with a central hole therethrough through which the center of at least one of said plate members may be contacted for transfer of said linear motion thereof.

34. Pressure translating means as set forth in claim 26 in which said body means includes a cylindrical cavity in which is carried a cylindrical support member on which is provided said annular support shoulder for said circular plate member.

35. Means for amplifying linear motion of a movable input device comprising:
a variable volume chamber comprising a cylindrical cavity filled with fluid;
a reciprocal piston member the head of which defines one end of said variable volume chamber, said piston member being responsive to linear motion of said input device; and
a fluid container including a vertical transparent tubular member the lower end of which is in fluid communication with said variable volume chamber and partially filled with said fluid, the volume of said variable chamber and the level of said fluid in said fluid container being determined by the amount of linear motion of said input device, the upper end of said transparent tubular member being provided with filter means which allows passage of air therethrough but prevents escape of said fluid from said tubular member.

36. Amplifying means as set forth in claim 35 in which the cross-sectional area of said cavity is substantially greater than the cross-sectional area of said transparent tubular member so that predetermined linear motion of said piston member results in predetermined predictable amplified motion of the level of said fluid in said tubular member.

37. Amplifying means as set forth in claim 36 in which said vertical transparent tubular member is of uniform cross-sectional area and provided with indicia thereon corresponding with levels of fluid therein to indicate the amount of linear motion of said input device.

38. Amplifying means as set forth in claim 35 in which said fluid container includes an inverted cup-like reservoir between the lower end of said transparent tubular member and said variable volume chamber.

39. Amplifying means as set forth in claim 38 in which said variable volume chamber is in fluid communication with said fluid container through a restricted fluid passage including a small tubular member projecting centrally upwardly into said inverted cup-like reservoir, the volume of said cup-like reservoir being greater than twice the volume of said transparent tubular member.

40. Amplifying means as set forth in claim 37 including a small fluid chamber in fluid communication with said variable volume chamber and having a sealed adjustment member therein adjustment of which changes said level of fluid in said transparent tubular member.

41. Amplifying means as set forth in claim 36 including a flexible diaphragm member covering the opening of said cylindrical cavity to maintain said fluid therein and against which said piston head bears upon reciprocation within said recess.

42. Amplifying means as set forth in claim 41 in which said fluid container and the side of said piston member opposite the head thereof are subjected to equal air pressure.

43. Amplifying means as set forth in claim 36 comprising a transmission assembly between said input device and said piston member and by which said linear motion of said input device is transmitted thereto.

44. Amplifying means as set forth in claim 43 in which said transmission assembly comprises spring means between said piston member and said input device capable of absorbing sudden linear motion of said input device.

* * * * *